United States Patent
Guo et al.

(10) Patent No.: US 9,100,931 B2
(45) Date of Patent: Aug. 4, 2015

(54) METHOD AND APPARATUS FOR IMPROVING FREQUENCY PRIORITIZATION IN A WIRELESS COMMUNICATION NETWORK

(71) Applicant: INNOVATIVE SONIC CORPORATION, Taipei (TW)

(72) Inventors: Yu-Hsuan Guo, Taipei (TW); Meng-Hui Ou, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 128 days.

(21) Appl. No.: 13/894,677

(22) Filed: May 15, 2013

(65) Prior Publication Data

US 2013/0308515 A1    Nov. 21, 2013

Related U.S. Application Data

(60) Provisional application No. 61/648,777, filed on May 18, 2012.

(51) Int. Cl.
*H04W 72/10* (2009.01)
*H04W 72/00* (2009.01)

(52) U.S. Cl.
CPC ............ *H04W 72/005* (2013.01); *H04W 72/10* (2013.01)

(58) Field of Classification Search
CPC ............................. H04W 72/005; H04W 72/10
USPC .......................... 370/230, 252, 312, 329, 331
See application file for complete search history.

(56) References Cited

U.S. PATENT DOCUMENTS

| | | | | |
|---|---|---|---|---|
| 8,929,222 B2 * | 1/2015 | Rosik | ........................ | 370/241 |
| 2009/0031362 A1 * | 1/2009 | Paila | ........................ | 725/62 |
| 2010/0093341 A1 * | 4/2010 | Yu | ........................ | 455/426.1 |
| 2010/0216469 A1 * | 8/2010 | Yi et al. | ........................ | 455/435.3 |
| 2010/0240367 A1 * | 9/2010 | Lee et al. | ........................ | 455/435.2 |
| 2010/0272004 A1 * | 10/2010 | Maeda et al. | ........................ | 370/312 |
| 2011/0013550 A1 * | 1/2011 | Wu | ........................ | 370/312 |
| 2011/0199905 A1 * | 8/2011 | Pinheiro et al. | ........................ | 370/235 |
| 2012/0020231 A1 * | 1/2012 | Chen et al. | ........................ | 370/252 |
| 2012/0275369 A1 * | 11/2012 | Zhang et al. | ........................ | 370/312 |
| 2013/0034080 A1 * | 2/2013 | Yang et al. | ........................ | 370/331 |
| 2013/0083715 A1 * | 4/2013 | Etemad et al. | ........................ | 370/312 |
| 2013/0155881 A1 * | 6/2013 | Amerga et al. | ........................ | 370/252 |
| 2013/0287002 A1 * | 10/2013 | Kim et al. | ........................ | 370/331 |
| 2013/0301509 A1 * | 11/2013 | Purnadi et al. | ........................ | 370/312 |
| 2014/0099969 A1 * | 4/2014 | Hwang et al. | ........................ | 455/453 |

(Continued)

OTHER PUBLICATIONS

Huawei, "Discussion on redirection information in RRC connection release message", Aug. 18-22, 2008, Jeju, Korea, 3GPP TSG-RAN WG2 #63, R2-084305.*

(Continued)

*Primary Examiner* — Gary Mui
*Assistant Examiner* — Michael Phillips
(74) *Attorney, Agent, or Firm* — Blue Capital Law Firm, P.C.

(57) ABSTRACT

A method and apparatus are disclosed for improving frequency prioritization in a wireless communication network. The method includes the UE setting a priority on whether to prioritize MBMS reception over unicast. The method also includes the UE deciding whether to follow a redirection information or a de-prioritization information based on the UE's setting of prioritization of MBMS reception over unicast.

18 Claims, 5 Drawing Sheets

(56) References Cited

U.S. PATENT DOCUMENTS

| | | | |
|---|---|---|---|
| 2014/0105095 A1* | 4/2014 | Lee et al. | 370/312 |
| 2014/0192703 A1* | 7/2014 | Chun et al. | 370/312 |
| 2014/0314046 A1* | 10/2014 | Jung et al. | 370/331 |
| 2014/0329529 A1* | 11/2014 | Jung et al. | 455/436 |
| 2014/0357256 A1* | 12/2014 | Bromell et al. | 455/422.1 |
| 2015/0009958 A1* | 1/2015 | Chang et al. | 370/331 |
| 2015/0023243 A1* | 1/2015 | Liu | 370/312 |
| 2015/0036569 A1* | 2/2015 | Vannithamby et al. | 370/311 |
| 2015/0043533 A1* | 2/2015 | Kim et al. | 370/331 |
| 2015/0065140 A1* | 3/2015 | Zhi et al. | 455/436 |
| 2015/0071157 A1* | 3/2015 | Jung et al. | 370/312 |

OTHER PUBLICATIONS

Alfano, "LS on RR failures and network reselection"; Mar. 26-30, 2012, 3GPP, 3GPP TSG RAN WG2 Meeting #77bis Jeju, Korea, R2-121063.*

3GPP, "3rd Generation Partnership Project; Technical Specification Group Core Network and Terminals; Non-Access-Stratum (NAS) protocol for Evolved Packet System (EPS); Stage 3 (Release 11)", Mar. 2012, 3GPP, 3GPP TS 24.301 V11.2.1.*

3GPP, "3rd Generation Partnership Project; Technical Specification Group Radio Access Network; Evolved Universal Terrestrial Radio Access (E-UTRA); Radio Resource Control (RRC); Protocol specification (Release 10)", Mar. 2012, 3GPP, 3GPP TS 36.331 V10.5.0.*

Alcatel-Lucent, "Report of email discussion [77bis#24] Joint/TEI: RAT/PLMN selection upon RRC Connection Reject", May 21-25, 2012, 3GPP, 3GPP TSG RAN WG2 #78 R2-122720.*

Huawei, "Introduction of service contimuity improvements for MBMS on LTE", May 21-25, 2012, 3GPP, 3GPP TSG-RAN WG2 Meeting #78 R2-122078.*

3GPP TSG-RAN WG2 Meeting #75, Aug. 22-26, 2011, Athens, Greece (R2-114282).

3GPP TSG-RAN WG2 Meeting #76, San Francisco, USA, Nov. 14-18, 2011 (R2-116259).

3GPP TSG-RAN WG2 Meeting #77, Feb. 6-10, 2012, Dresden, Germany (R2-120492).

3GPP TSG-RAN WG2 Meeting #77bis, Jeju, Korea, Mar. 26-30, 2012 (R2-121063).

Search Report on corresponding EP Patent Application No. 13002583.6 dated Nov. 29, 2013.

\* cited by examiner

METHOD AND APPARATUS FOR IMPROVING FREQUENCY PRIORITIZATION IN A WIRELESS COMMUNICATION NETWORK

CROSS REFERENCE TO RELATED APPLICATIONS

The present Application claims the benefit of U.S. Provisional Patent Application Ser. No. 61/648,777 filed on May 18, 2012, the entire disclosure of which is incorporated herein by reference.

FIELD

This disclosure generally relates to wireless communication networks, and more particularly, to a method and apparatus for improving prioritization in a wireless communication network.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for improving frequency prioritization in a wireless communication network. The method includes the UE setting a priority on whether to prioritize MBMS reception over unicast. The method also includes the UE deciding whether to follow a redirection information or a de-prioritization information based on the UE's setting of prioritization of MBMS reception over unicast.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. R2-121063, "LS on RR failures and network reselection", 3GPP TSG CT WG1; TS 24.301 V11.2.1, "NAS protocol for EPS; Stage3 (Release 11)"; TS 36.331 V10.5.0, "E-UTRA; RRC protocol specification (Release 10)"; R2-122720, "Report of email discussion [77bis#24] Joint/TEI: RAT/PLMN selection upon RRC Connection Reject", Alcatel-Lucent (rapporteur); R2-122078, "Introduction of service continuity improvements for MBMS on LTE", Huawei. The standards and documents listed above are hereby expressly incorporated herein.

Figure 1:
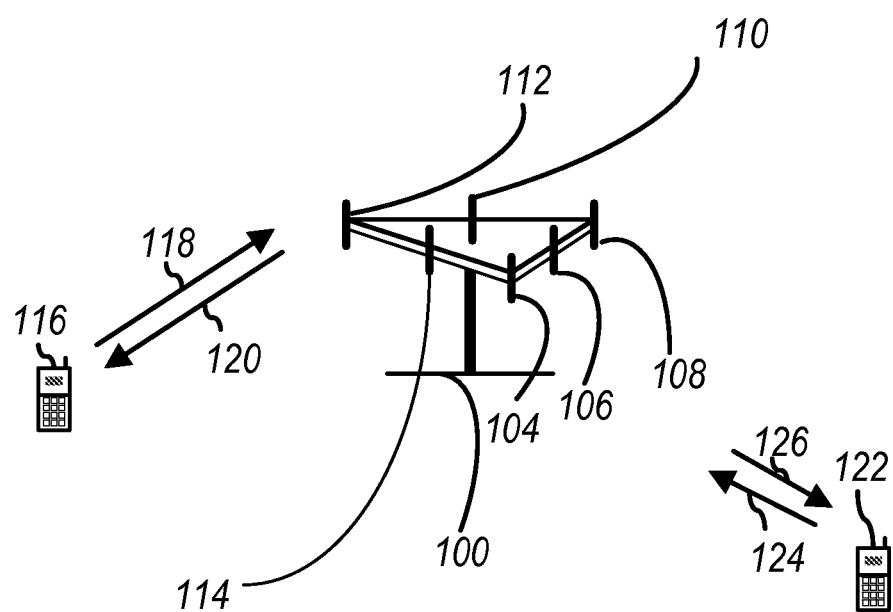
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
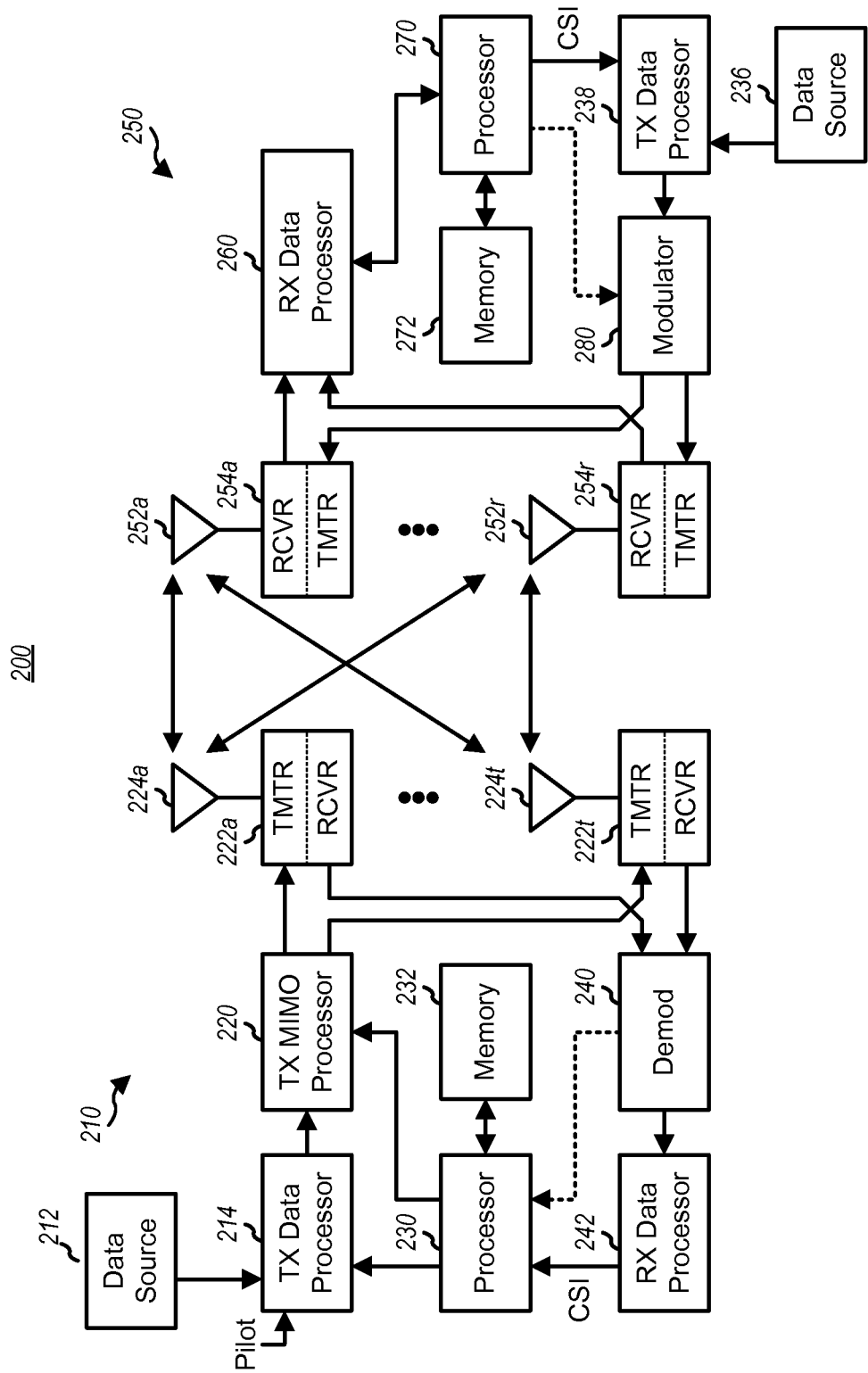
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system, to estimate the channel response. The multiplexed pilot and coded data for each data stream, is then modulated (i.e., symbol mapped) based on a particular modulation scheme (e.g., BPSK, QPSK M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a DC data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received, by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights that processes the extracted message.

Figure 3:
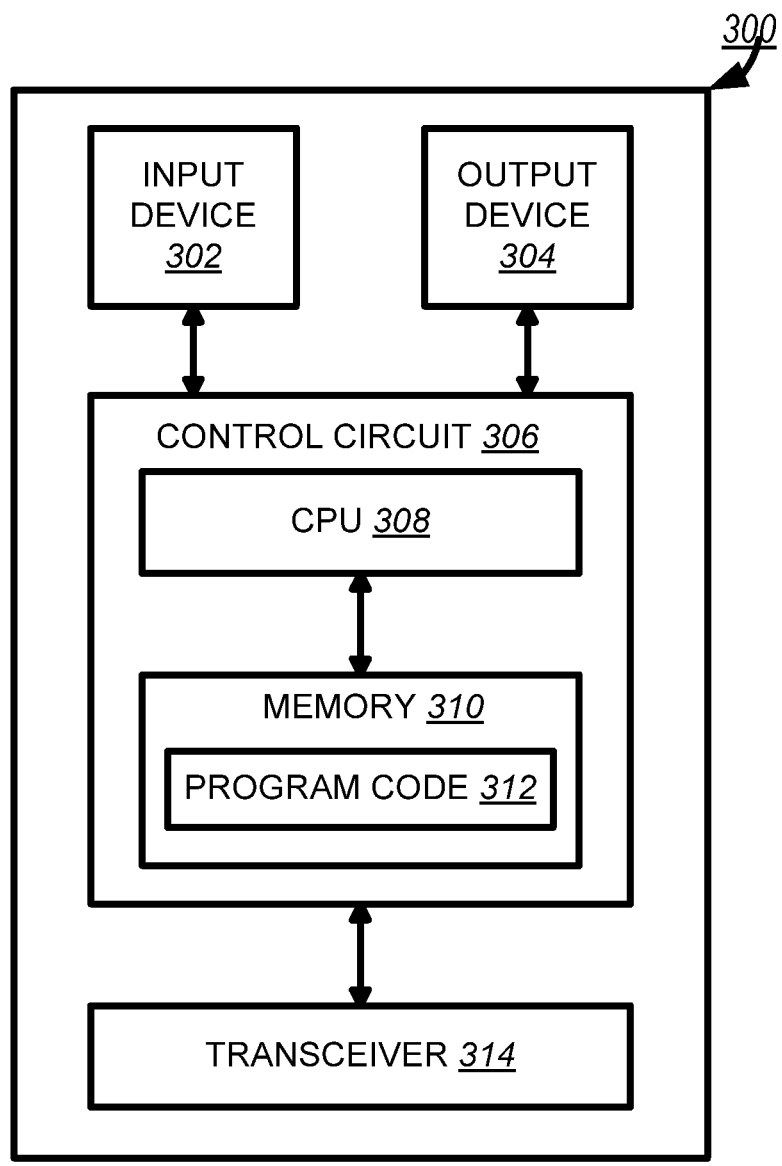
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input, device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
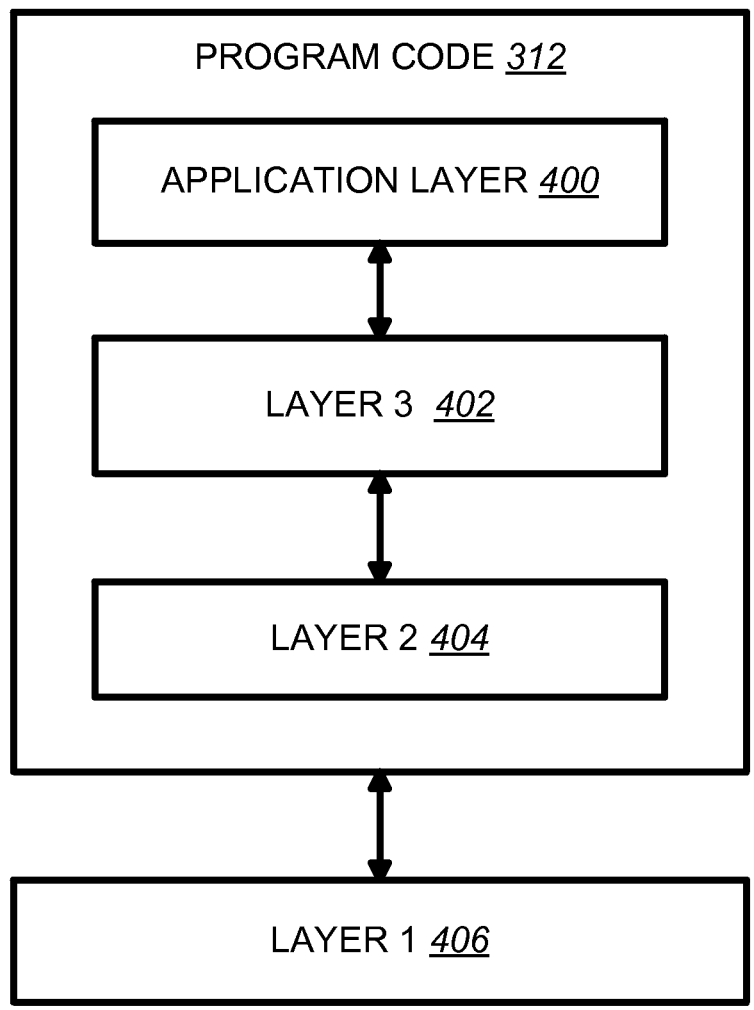
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In RAN2 #77bis meeting a LS (Liason) from CT1 (Core Network and Terminals Working Group 1) introduced an issue that a UE receiving RRCConnectionReject message stays in the current serving cell and applies the normal cell reselection process while a different frequency or RAT (Radio Access Technology) may be available where the UE could be successful in establishing the connection in some network deployment. More specifically, 3GPP R2-121063 states:

There are certain scenarios where a UE request to establish a RRC connection is rejected by the network through RRC connection reject. Currently TS 24.301 specifies the UE behaviour for failure to establish the signalling connection in the same way as cases of access class barring.

In addition, Section 5.5.1.2.6 of 3GPP TS 24.301 states:

The UE stays in the current serving cell and applies the normal cell reselection process. The attach procedure is started as soon as possible, i.e. when access for "signalling" is granted on the current cell or when the UE moves to a cell where access for "signalling" is granted.

The detail of the NAS behaviour could be found in 3GPP TS 24.301 V11.2.1; and the detail of the RRC connection procedure could be found in 3GPP TS 36.331 V10.5.0.

Furthermore, the issue was discussed in the E-mail discussion [77b#24] and the report of this discussion is in 3GPP R2-122720. Several solutions have been raised in the discussion, including:

1) NAS (Non-Access Stratum) solution: The RRC (Radio Resource Control) Connection Reject case would cause the attach attempt/TAU (Tracking Area Update) attempt counter to be incremented which limits the number of RRC Connection attempts to five. Once the number of failed attempts has reached five, the UE could transition to a state that permits selection of a different PLMN (Public Land Mobile Network)/RAT (Radio Access Technology).
2) RAN (Radio Access Network) solution 1: Use of re-direction with RRC connection release without knowledge of UE capability.
3) RAN solution 2: Signalling the de-prioritisation of the current carrier/RAT (or set of LTE frequencies) in Reject.
4) RAN solution 3: Re-direction with Reject without knowledge of UE capabilities.

The detail of the aforementioned alternative solutions could be found in 3GPP R2-122720.

Currently, the LTE is allowed to prioritize a MBMS (Multimedia Broadcast Multicast Service) frequency if it is interested to receive or is receiving MEMS services (as described in 3GPP R2-122078). More specifically, 3GPP R2-122078 states:

In RRC_IDLE, the UE applies the normal cell reselection rules with the following modifications:
the UE which is receiving MBMS service(s) via MBSFN and can only receive these MBMS service(s) via MBSFN while camping on the frequency providing these MBMS service(s) is allowed to make this frequency highest priority;
the UE which is interested in receiving MBMS service(s) via MBSFN and can only receive these MBMS service(s) via MBSFN while camping on the frequency providing these MBMS service(s) is allowed to make this frequency highest priority when it intends to receive these MBMS service(s) and a session is already available or about to start via MBSFN;

When the UE is camping on a prioritized MBMS frequency and tries to connect to the network while the network is congested, it is possible that the network may redirect the UE to another frequency or make the UE de-prioritize a frequency, a set of frequencies, and/or RAT using the solutions proposed above (such as RRCConnectionReject with de-prioritization signalling). In this case, if the UE follows the redirection or de-prioritization, it may not be able to receive MBMS anymore. But if the UE stays in the current frequency, it may not be able to establish a RRC connection successfully.

Currently, the UE could set a priority on whether to prioritize MBMS reception over unicast. The priority of MBMS reception over unicast could be used to help the UE decide a proper action in the situation discussed above.

In one embodiment, the general concept is that when a UE is receiving a MBMS service via MBSFN (Multicast Broadcast Single Frequency Network) or is interested in receiving a MBMS service via MBSFN, the UE would decide whether to follow the redirection or the de-prioritization information based on whether the UE prioritizes MBMS reception over unicast.

As an example, if the UE prioritizes MBMS reception over unicast, the UE would ignore the redirection information (e.g., in the case that the MBMS frequency is not in the redirection information) or the de-prioritization information (e.g., in the case that the MBMS frequency is in the de-prioritization information). As another example, if the UE prioritizes MBMS reception over unicast, the UE would ignore the redirection information (e.g., in the case that the MBMS frequency is not in the redirection information) or the de-prioritization information (e.g., in the case that the MBMS frequency is in the de-prioritization information) if no interested MBMS frequency could be camped on. On the other hand, if the UE prioritizes unicast over MBMS reception, the UE would follow the redirection or the de-prioritization information. The above rules may apply to the UE that could only receive the MBMS service(s) via MBSFN while camping on the frequency providing the MBMS service(s).

Figure 5:
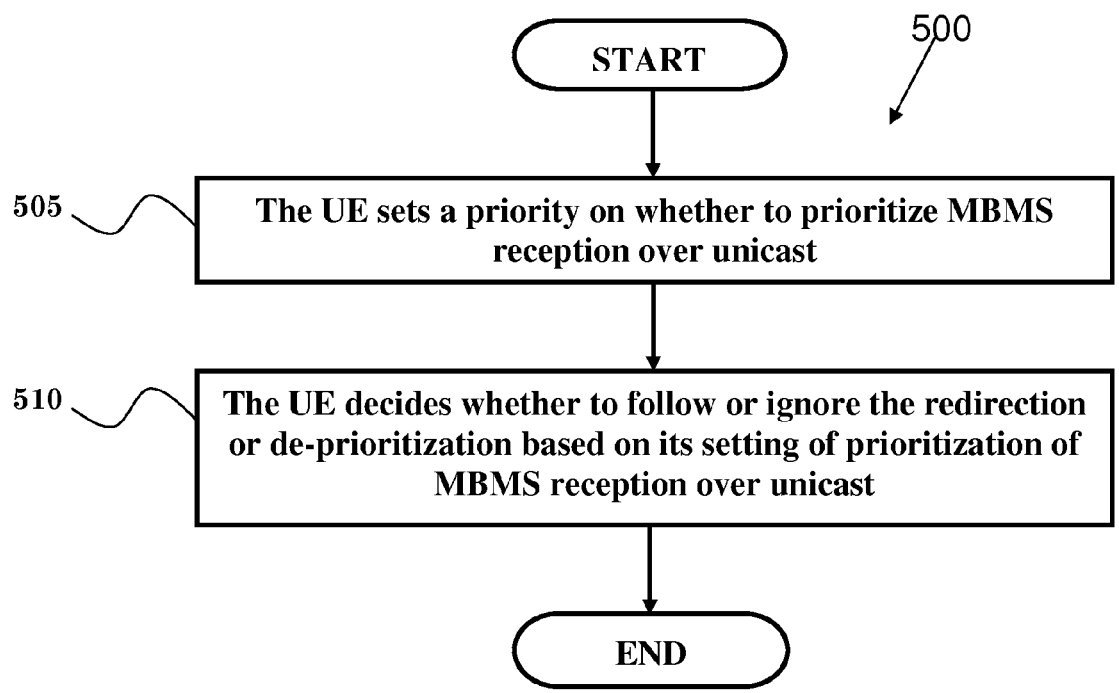
FIG. 5 is a flow chart according to one exemplary embodiment.

FIG. 5 is a flow chart 500 according to one exemplary embodiment. In step 505, the UE sets a priority on whether it prioritizes MBMS reception over unicast. In step 510, the UE decides whether to follow or ignore the redirection information or the de-prioritization information based on the setting of prioritization of MBMS reception over unicast. In one embodiment, the UE could be actually receiving a MBMS service via MBSFN. Alternatively, the UE could be interested in receiving and intends to receive a MBMS service via MBSFN, and a session is already available or about to start via MBSFN. In this embodiment, the "interested" MBMS frequency, which could be the frequency providing the MBMS service that the UE is actually receiving or is interested in receiving via MBSFN, is included in the de-prioritization information or not included in the redirection information. Furthermore, the UE would give the highest priority in the cell selection or cell reselection procedure to the interested MBMS frequency if the UE prioritizes MBMS reception over unicast. In addition, the UE may still apply the normal cell selection or cell reselection rules except for the modification of making the MBMS frequency the highest priority. Besides, there may be only one frequency that provides a MBMS service that the UE is interested in or is receiving via MBSFN.

In one embodiment, the redirection information or the de-prioritization information is received in a RRC Connection Reject message or a RRC Connection Release message, and is for a frequency, a set of frequencies or a RAT. The frequency could be the frequency that the UE currently camps on. In addition, the redirection information or the de prioritization information is provided (1) when the UE is in RRC_CONNECTED or is about to enter RRC_CONNECTED, or (ii) from an upper layer (e.g., NAS—Non Access Stratum) when a maximum number of failed attempts of Attach, Tracking Area Update, or Service Request messages is reached.

In one embodiment, the UE is in RRC_IDLE or is performing cell selection or reselection procedure when deciding whether to follow the redirection information or the de-prioritization information. The UE would ignore or not follow the redirection information or the de-prioritization information if the UE prioritizes MBMS reception over unicast. Furthermore, the UE may have no interested MBMS frequency to camp on except for the MBMS frequency not in the redirection information or except for the MBMS frequency in the de-prioritization information. On the other hand, the UE would follow the redirection information or the de-prioritization information if the UE does not prioritize MBMS reception over unicast.

Referring back to FIGS. 3 and 4, the device 300 includes a program code 312 stored in memory 310. In one embodiment, the CPU 308 could execute the program code 312 so that (i) the LTE sets a priority on whether to prioritize MBMS reception over unicast, and (ii) the UE decides whether to follow a redirection information or a de-prioritization information based on the UE's setting of prioritization of MBMS reception over unicast.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not, meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for improving frequency prioritization in a wireless communication network, comprising:
    setting, by a user equipment (UE), a priority on whether to prioritize Multimedia Broadcast Multicast Service (MBMS) reception over unicast; and
    deciding, by the UE, whether to follow a redirection information or a de-prioritization information based on the UE's setting of prioritization of MBMS reception over unicast,
    wherein the UE gives a highest priority in a cell selection or cell reselection procedure to a MBMS frequency if the UE prioritizes MBMS reception over unicast, and
    wherein the MBMS frequency, which provides a MBMS service that the UE is receiving or is interested in receiving, is in the de-prioritization information.

2. The method of claim 1, wherein the redirection information or the de-prioritization information is in a received RRC Connection Reject message or a RRC Connection Release message.

3. The method of claim 1, wherein the redirection information or the de-prioritization information is for a frequency, a set of frequencies, or a RAT (Radio Access Technology).

4. The method of claim 1, wherein the redirection information or the de-prioritization information is provided when the UE is in RRC_CONNECTED or is about to enter RRC_CONNECTED, or is provided from an upper layer (e.g., NAS—Non Access Stratum) when a maximum number of failed attempts of Attach/Tracking Area Update/Service Request message is reached.

5. The method of claim 1, wherein the UE is in RRC_IDLE or is performing cell selection or reselection procedure when deciding whether to follow the redirection information or the de-prioritization information.

6. The method of claim 1, wherein the UE would ignore or would not follow the redirection information or the de-prioritization information if the UE prioritizes MBMS reception over unicast.

7. The method of claim 1, wherein the UE would follow the redirection information or the de-prioritization information if the UE does not prioritize MBMS reception over unicast.

8. The method of claim 1, wherein the UE is receiving the MBMS service via MBSFN (Multicast Broadcast Single Frequency Network) or is interested in receiving the MBMS service via MBSFN.

9. The method of claim 1, wherein the MBMS frequency, which provides the MBMS service that the UE is receiving or is interested in receiving, is not in the redirection information.

10. A communication device for improving frequency prioritization in a wireless communication network, the communication device comprising:
a control circuit;
a processor installed in the control circuit;
a memory installed in the control circuit and operatively coupled to the processor;
wherein the processor is configured to execute a program code stored in memory to improve frequency prioritization for a user equipment (UE) by:
setting a priority on whether to prioritize Multimedia Broadcast Multicast Service (MBMS) reception over unicast; and
deciding whether to follow a redirection information or a de-prioritization information based on the UE's setting of prioritization of MBMS reception over unicast,
wherein the UE gives a highest priority in a cell selection or cell reselection procedure to a MBMS frequency if the UE prioritizes MBMS reception over unicast, and
wherein the MBMS frequency, which provides a MBMS service that the UE is receiving or is interested in receiving, is in the de-prioritization information.

11. The communication device of claim 10, wherein the redirection information or the de-prioritization information is in a received RRC Connection Reject message or a RRC Connection Release message.

12. The communication device of claim 10, wherein the redirection information or the de-prioritization information is for a frequency, a set of frequencies, or a RAT (Radio Access Technology).

13. The communication device of claim 10, wherein the redirection information or the de-prioritization information is provided when the UE is in RRC_CONNECTED or is about to enter RRC_CONNECTED, or is provided from an upper layer (e.g., NAS—Non Access Stratum) when a maximum number of failed attempts of Attach/Tracking Area Update/Service Request message is reached.

14. The communication device of claim 10, wherein the UE is in RRC_IDLE or is performing cell selection or reselection procedure when deciding whether to follow the redirection information or the de-prioritization information.

15. The communication device of claim 10, wherein the UE would ignore or would not follow the redirection information or the de-prioritization information if the UE prioritizes MBMS reception over unicast.

16. The communication device of claim 10, wherein the UE would follow the redirection information or the de-prioritization information if the UE does not prioritize MBMS reception over unicast.

17. The communication device of claim 10, wherein the UE is receiving the MBMS service via MBSFN (Multicast Broadcast Single Frequency Network) or is interested in receiving the MBMS service via MBSFN.

18. The communication device of claim 10, wherein the MBMS frequency, which provides the MBMS service that the UE is receiving or is interested in receiving, is not in the redirection information.

* * * * *